(12) United States Patent
Bjornsson et al.

(10) Patent No.: US 9,079,223 B2
(45) Date of Patent: Jul. 14, 2015

(54) METHOD AND APPARATUS FOR PORTIONING OF ARTICLE

(75) Inventors: Yngvi Bjornsson, Reykihlid (IS); Einar Bjorn Jonsson, Reykjavik (IS); Helgi Hjalmarsson, Kopavogur (IS)

(73) Assignee: VALKA EHF and REYKJAVIK UNIVERSITY (IS)

(*) Notice: Subject to any disclaimer, the term of this patent is extended or adjusted under 35 U.S.C. 154(b) by 678 days.

(21) Appl. No.: 13/390,952

(22) PCT Filed: Jul. 28, 2010

(86) PCT No.: PCT/IB2010/002109
§ 371 (c)(1),
(2), (4) Date: Feb. 17, 2012

(87) PCT Pub. No.: WO2011/021100
PCT Pub. Date: Feb. 24, 2011

(65) Prior Publication Data
US 2012/0150339 A1    Jun. 14, 2012

(30) Foreign Application Priority Data
Aug. 19, 2009 (GB) .................................. 0914530.1

(51) Int. Cl.
| | |
|---|---|
| G06F 7/00 | (2006.01) |
| B07C 5/38 | (2006.01) |
| G01G 19/387 | (2006.01) |
| B65B 25/06 | (2006.01) |

(52) U.S. Cl.
CPC ................ B07C 5/38 (2013.01); G01G 19/387 (2013.01); B65B 25/061 (2013.01); B65B 25/064 (2013.01)

(58) Field of Classification Search
None
See application file for complete search history.

(56) References Cited

U.S. PATENT DOCUMENTS

| | | | |
|---|---|---|---|
| 4,442,910 A | 4/1984 | Mikami | |
| 4,557,019 A | 12/1985 | Van Devanter et al. | |
| 4,821,820 A | 4/1989 | Edwards et al. | |
| 5,998,740 A | 12/1999 | Kvisgaard et al. | |
| 6,321,135 B1* | 11/2001 | Asgeirsson | 700/213 |
| 6,388,209 B1 | 5/2002 | Gudmundsson | |
| 7,967,149 B2 | 6/2011 | Helgi | |

(Continued)

FOREIGN PATENT DOCUMENTS

| | | |
|---|---|---|
| GB | 2405081 | 2/2005 |
| WO | 8908983 | 10/1989 |

(Continued)

OTHER PUBLICATIONS

International Search Report for PCT/IB2010/002109, Completed by the European Patent Office on Dec. 20, 2010, 4 Pages.

Primary Examiner — Yolanda Cumbess
(74) Attorney, Agent, or Firm — Brooks Kushman P.C.

(57) ABSTRACT

A method is provided for allocating a first item from a group of items to a receiver selected from a group of receivers. The method includes obtaining characteristic property information for the group of items and obtaining capacity information for the group of receivers. According to the method, a characteristic property of the first item which is to be allocated and a characteristic property of a selected second item within the group of items are used in consideration of possible options for allocating said first and second items to the group of receivers. Taking into account the respective capacities of receivers in the group of receivers, it is then determined which receiver should be selected for allocation of the first item thereto.

18 Claims, 4 Drawing Sheets

(56) References Cited

U.S. PATENT DOCUMENTS

| | | |
|---|---|---|
| 2004/0231480 A1 | 11/2004 | Wattles et al. |
| 2005/0032471 A1 | 2/2005 | Pfarr et al. |
| 2005/0137744 A1 | 6/2005 | Winkelmolen et al. |
| 2009/0301940 A1 | 12/2009 | Elvarsson et al. |

FOREIGN PATENT DOCUMENTS

| | | |
|---|---|---|
| WO | 9944759 | 9/1999 |
| WO | 0107324 | 2/2001 |
| WO | 2006106532 | 10/2006 |
| WO | 2007083327 | 7/2007 |

* cited by examiner

First layer    Second layer

METHOD AND APPARATUS FOR PORTIONING OF ARTICLE

CROSS-REFERENCE TO RELATED APPLICATION

This application is the U.S. national phase of PCT Appln. No. PCT/PCT/IB2010/002109 filed Jul. 28, 2010, which claims priority to GB application 0914530.1 filed Aug. 19, 2009 the disclosures of which are incorporated in their entirety by reference herein.

The present invention relates to a method for portioning of articles. In particular it relates to a method for portioning food articles based on at least one characteristic of the articles.

BACKGROUND

There are many industries in which the sorting, allocation or otherwise portioning of articles is important, particularly for storage and transport of those articles. This is of particular interest in the food industry, wherein the business of packaging, storing and transporting food from its source to the retailer or end user is very important. It is highly desirable to portion food items in the most efficient possible manner in order to protect and preserve food items whilst at the same time making the optimum use of the space available, to improve the cost effectiveness of the process.

Many known approaches use algorithms in an attempt to optimize the number and nature of items to be placed in one or more containers having particular capacity and target fill levels. A particular problem for filling containers with a predefined target item weight, using a limited number of items of known weight and having a limit on the number of containers that can be opened for filling at any given time, is known as the "on-line bounded-space bin-cover problem". The problem of finding an optimal bin cover is known to be NP-hard, making it unlikely that an efficient polynomial algorithm exists for finding an optimal solution to the problem.

In the food industry there are several grading and portioning tasks which are primarily done by hand since known algorithms are not suited to address or automate these tasks. For example, fresh fish fillets and poultry breast fillets are commonly packed in so-called interleaved packs, which is one example of a packing method which puts extra burden on algorithm portioning solutions. Interleaved packs are typically block frozen. The fillets are placed in layers where the fillets are not touching and then there is a plastic film placed on top of the layer before the next layer of fillets is placed in the pack. These packs are commonly selected by restaurants as they are very compact but the fillets are not frozen together so any number of pieces can be taken from the pack for cooking.

When packing cod fillets in interleaved packs it is most common to have three fillets in each layer and the fillets in the first layer are placed as shown in FIG. 1 where the tails are placed towards the centre of the pack while the thicker loin parts are towards the edges. The Figure shows as well that two fillets have the tail part pointing downwards and one upwards. When the next layer is placed this is opposite as two fillets have now the tail part facing upwards and one downwards but the tails are still placed towards the centre. In addition to these requirements the packs must be of fixed weight and can also have a requirement that a certain predefined number of fillets must be in the pack.

To be able to make an interleaved pack fully automatically there are two known alternatives. One is to make a more complicated grader machine which can selectively rotate the fillets and then the associated batching algorithm does not have to take into account the orientation of the fillets. The other method is to place every other fillet in the packing machine with tail facing to the left while the other fillets have the tail facing in the opposite direction. This will however put a requirement on the portioning algorithm used, to be able to select fillets. Current methods which are purely based on combinatory or statistical methods are not at all suited for such a task.

Both for interleaved and other packing arrangements, in the food industry there is a high demand for grading and packing articles into packs of fixed weight. In the last years, some progress has been made in the development of methods for grading and packing articles into packs of fixed weight. These methods are sometimes referred to as "intelligent batching" wherein the articles are intelligently selected into different batches (portions) to make them as close as possible to a predefined target weight. When aiming at creating so called fixed weight portions—that is, portions which have a weight as little as possible above a predefined minimum weight—there are mainly two methods which are used; accumulation weighing and combination weighing.

According to the accumulation weighing principle, items that are to be allocated to a container or other packaging or storage means are weighed on a dynamic scale, and the weights are registered in order to keep track of the relevant placement of the items in a line and of the corresponding weights. A distribution unit then allocates the individual items to one or more receiver bins, until the accumulated weight in a particular bin matches a target weight. However, accumulation weighing has several disadvantages. Typically in these methods the weight of only a single article is known when a decision is made as to which of a plurality of receiver bins the article will be guided to. This creates significant disadvantage as the method can not ensure that a portion in a receiver bin will be finished a certain weight above the target weight as it can only predict with certain probability that the method will be able to complete the portion within a given weight. It is furthermore hardly feasible to use this method to create packs with special requirements like in the case with interleaved packs.

U.S. Pat. No. 5,998,740 discloses a weighing and portioning technique based on a "grader" technique, which is a development of accumulation weighing, wherein a number of articles which are to be portioned out, namely natural foodstuff items with non-uniform varying weight, are fed through a weighing station and thereafter selectively fed to a plurality of receiver bins. The technique includes weighing a finite number of items which are to be portioned out and using the distribution of weights of those items to statistically evaluate the best possible apportionment of the articles.

Another known method is described in patent EP01218244B1 in which, instead of the prospect functions for the filling of one or more bins being generated based on a single item, the prospects are based on a so-called Tally Intelligent Batching Algorithm. The tally is the total number of possible combinations of items present in a first-in-first-out (FIFO) queue as a function of batch shortage and item count. This method can utilize knowledge of having more than a single item to be allocated of known weight but as it works with the number of possible ways of creating combinations as opposed to trying out actual assignments of the items to the bins it may overlook good assignments. Furthermore, it is computationally intensive and inefficient and is not suited to solve special packing requirements for example when packing interleaved packs.

According to the combination weighing principle, the combined weight of multiple articles to be allocated are known. Typically there are multiple weighing hoppers and the articles from any of the hoppers can be released to create the portions to fill a container or bin. There is thus random access to the weighing hoppers and hoppers which have been emptied can be selectively filled. By using combinatory algorithms, the combination of hopers which generates the least give-away is selected and subsequently the articles are released from these hoppers and unified to create the portion. The weighing hopper machines which utilize this combination weighing method are typically either in circular arrangement or in a linear arrangement as described in U.S. Pat. Nos. 4,442,910 and 4,821,820. The main disadvantage of this method is that random access to many hoppers is expensive to build and also difficult to implement when handling delicate items such as fresh fish products, for which it is preferred that the articles go directly after weighing into the final packs rather than to be placed in intermediate weighing hoppers and collected in the pack with a shoot or intermediate conveyor as is typically done in multi-head weighers.

Yet another set of methods exists wherein the weight of multiple articles are known, as in combination weighing, but the pieces are never the less fed sequentially into one or more receiving bins or containers. One example of such portioning method is in patent EP01060033B1. This method uses portion accumulation stations to temporarily hold one or more items until their weight is suitable to be added to a bin, to help achieve its target fill level. The main drawback of this method is that does not perform grading at the same time as portioning is done. Furthermore, if few number of articles with known weight are currently in the machine, it can not perform the portioning task accurately. Moreover, it requires additional space and apparatus for the accumulation stations, which adds to the overall expense.

The invention is set out in the claims.

Because a method of allocating an item within a group of items to a selected receiver from a group of receivers is provided, wherein a characteristic property of both that item and a selected other item within that group is considered along with capacity information on the receivers, an optimal allocation can be achieved. The allocation doesn't rely on assumed or predicted information, nor on statistical trends, but on actual characteristics of the item to be allocated, and of an item that may be allocated subsequently. The characteristic property of the items can include any of size, weight, length and orientation, or any other suitable property dependent on the type of item being considered. Because the method considers possible options for allocating both the first item and the second item to the group of available receivers, the knock-on effects of possible allocation choices for the first item can be looked at, and in particular the allocation of the first item can be selected so that viable options remain for allocation of the second item thereafter. Therefore the optimisation is not just instantaneously beneficial and accurate but has future considerations in mind also.

Because the successive addition of a plurality of items to the group of receivers can be considered, a cumulative picture of the effects of each allocation option is provided. This increases the intelligence of the method, and helps to refine and further optimise the item allocation process. Furthermore, by considering successive allocation of the plurality of items to two or more different combinations of receivers and comparing the respective effects of those allocation options on the capacity information for the group of receivers, the actual real world effects of the available allocation options are considered and the most favourable allocation option can thus be selected for determining which receiver the first item should be allocated to. Hence a more accurate solution is provided, which can deal with real world occurrences such as anomalies in the general trend of characteristic property information for items in the group of items.

By enabling the actual capacity of a receiver after allocation of an item thereto and/or a predicted capacity of a receiver after allocation of an item thereto to be considered, the look ahead abilities of the method are enhanced. That is, the method can use the actual characteristic property information it has regarding the items in the groups to extrapolate and predict future capacity effects which may influence the choice of receiver for allocation of the first item thereto. Because a predicted capacity of a receiver after allocation of an item thereto is based not only on historical allocation information but also on current allocation information, including characteristic property information for the actual remaining items to be allocated and/or capacity information for the actual receivers available for allocation of the those items thereto, the prediction can be better refined as compared to prior art methods that rely solely on previous trends or distributions. That is, any anomalies or unusual features of the actual items and receivers being considered can be taken into account when calculating how the capacity of a particular receiver might change after allocation of an item thereto.

By considering both a current fill level and a target fill level for the receivers, the allocation of the item can be better focused—allowing it to be allocated to the receiver in which it would be most useful in enabling the target fill level to be achieved efficiently, and avoiding or at least reducing the waste and potential loss of profits associated with an over-filled receiver. By looking ahead to see what the resulting fill level would be if the item was added to a particular receiver within the available group of receivers, a clear picture of how best to allocate that item or another item in the group can be obtained.

In particular, because the resulting receiver fill level can be considered if the other, second item was added to any of a number of different receivers within the available group of receivers, it is possible to look and plan ahead as part of the allocation process. That is, an allocation that would work well for the first item might prove to be less than optimal if the second item is considered.

By going one step further and looking at the resulting fill level if each of the items in the group of items available for allocation were allocated to one or more available receivers, the future planning and optimisation benefits are enhanced. This benefit is derived not just for allocation of the current group of items but can also be used in planning and controlling sorting and provision of subsequent groups to items for allocation. However, even when possible allocation of each of the items in a group of items is considered, only the allocation of the first of those items will be determined as a result. Ideally, updated item characteristic property information and capacity information is used every time a new item within the group of items is to be determinatively allocated.

By limiting the time period during which allocation determination is carried out, a balance is achieved between looking ahead to improve the optimisation of allocation of an individual item, and keeping the allocation process moving at an acceptable rate.

By discontinuing consideration of addition of an item to a particular receiver or combination of receivers, if that allocation option appears to provide a less favourable result than a result which an alternative option has already been shown to provide, computational efficiency and speed of the allocation process are improved. Furthermore, prioritising a particular receiver or combination of receivers based on capacity information allows an optimal allocation solution to be reached more quickly and efficiently. Similarly, ignoring a receiver or combination of receivers according to capacity information prevents wasting time on "dead-end" options, thus improving overall efficiency and speed.

By enabling user-defined constraints to be considered, flexibility and additional control is provided. Dependant on the particular items to be allocated and other real world considerations, the user defined constraints can include any number of factors including the number of items in the group of items, the number of receivers in the group of receivers, the number of items to be allocated per receiver, and any time limit for filling a receiver to a target level before it is replaced by a new, empty receiver. Furthermore, the orientation of an item for allocation and its configuration with one or more other items once allocated to a receiver can be considered. Therefore, particular packing arrangements such as interleaving can be efficiently and usefully incorporated into the allocation process.

Once the allocation determination has been made, the first item can be directed to the selected receiver.

By predicting future capacity information for the group of receivers using the allocation determined for the first item and a characteristic property of at least one of the remaining items in the group of items, the method enables intelligent selection of the next items for allocation and assists in the allocation determination for that subsequent item. In particular, because future receiver fill level can be predicted, allocation of the current group of items can be tailored accordingly and/or the provision of a future group of items for allocation of receivers for receiving such items can be intelligently selected.

By ensuring that the characteristic property information and capacity information is updated for the subsequent item to be allocated, it is ensured that at all times the most relevant and accurate available information is made use of, rather than relying on previously obtained or assumed trends or patterns which might have applied to earlier items but which cannot be guaranteed to apply equally well to the subsequent items to be allocated.

Therefore a method and associated control and operation is provided that has substantial advantages over prior art methods. The approach is accurate, efficient, intelligent and flexible, whilst at the same time being straight forward to implement using existing conveyance and receiver apparatus, and for a variety of item types.

Aspects will now be described with reference to the Figures, of which:

OVERVIEW

The present method relates to portioning of articles of known size, also known as "grading", wherein the grading comprises building up portions of the articles in containers or grading the articles onto one or more receiving areas. The method utilizes a search method to find the optimum receiving container or receiving area in which to place an article, based on one or more of several possible grading criteria. The most common characteristic considered for grading purposes is the weight of the articles and the most common criterion is to make the portions as close above a predefined desired weight of the portions.

Figure 1:
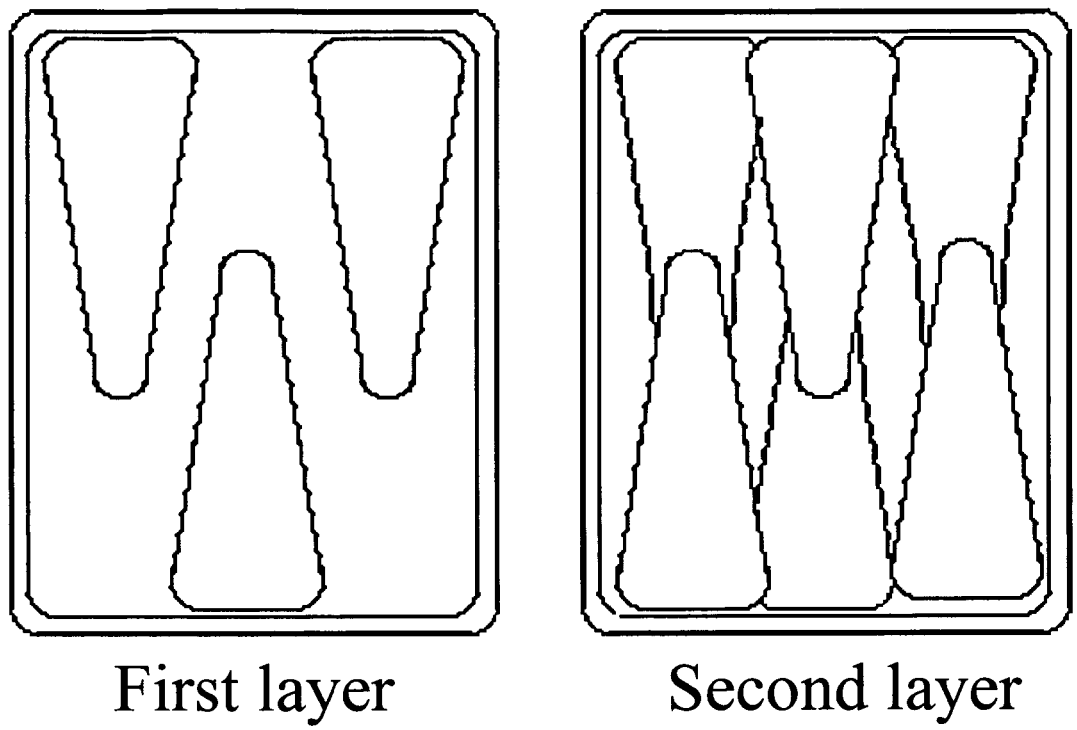
FIG. 1 shows first and second interleaved layers of packaged articles such as fish fillets.
Figure 2:
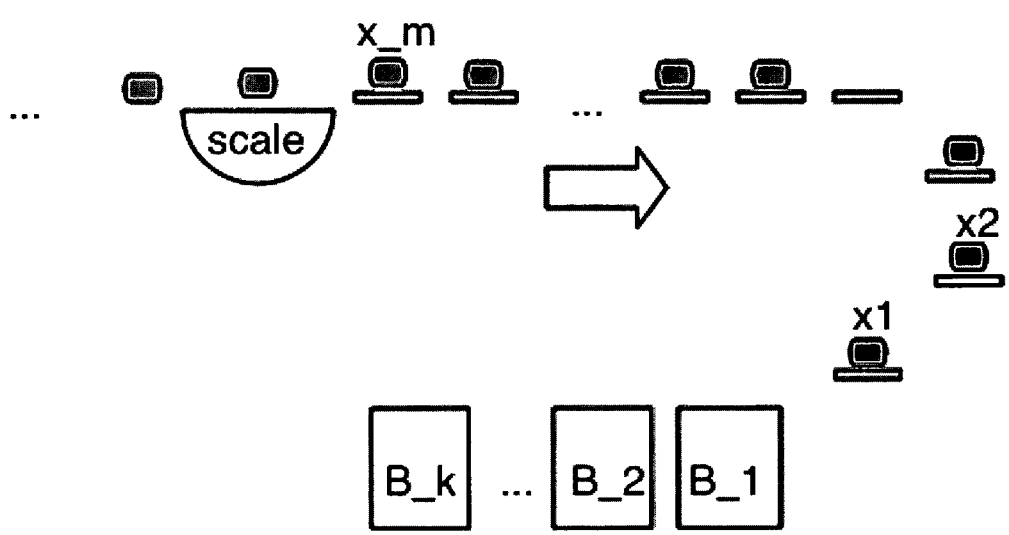
FIG. 2 shows an exemplary machine set up.

The method is primarily concerned with the problem of packing food items, e.g. fish fillets, into containers such that the accumulated overweight of filled containers is minimized. A container is considered full when its weight reaches or exceeds a given pre-defined target weight, with the overweight (or waste) defined as the difference between the final weight of the container and its target weight. In one possible setup, dictated by the production-line batching and grading machinery, the maximum number of simultaneously open containers a fillet can be assigned to is fixed, with the current weight of each container known and a container being replaced with an empty one once it fills (possibly after some delay). Furthermore, at any given time the size of 1 or more subsequent fillets to be assigned is known. This setup is schematized in FIG. 2. In practice, to keep up an acceptable level of throughput, a strict real-time constraint of, for example, only a few hundred milliseconds is imposed for dispatching each fillet.

The problem addressed herein can be formulated as an on-line bounded-space bin-cover problem, as briefly mentioned in the background section above. More specifically, the task is to assign items $X=\{x_1, x_2, \ldots, x_n\}$ with sizes (0,1] into bins of unit size so as to maximize the number of bins that are filled to a size of at least 1. The task is K-bounded-space because the number of open bins is not allowed to exceed K at any time during the operation. Furthermore, the task is online because the items arrive one at a time and must be assigned to a bin upon arrival. However, in contrast to the more widely studied bin-cover problem where only the size of the item being assigned ($x_i$) is known, it is assumed that the size of the upcoming "m" arriving items, including the one that is currently to be allocated, is known. That is, when item $x_i$ is being assigned the size of items $x_i, x_{i+1}, \ldots, x_{i+m-1}$ is known.

As detailed further below, an effective approximation algorithm is provided for performing an assignment of articles that makes good use of all available information. Furthermore, it allows for much flexibility in imposing various constraints on legitimate assignments, e.g. in respect to the combination of items put together in a bin (e.g. based on orientation such that items can be ordered into layers), or to the rate of which filled bins are being replaced.

The method described herein can work with one or more user-imposed additional requirements when building up the portions, such as selecting only articles with certain orientation which can then subsequently put a requirement on orientation of future articles to be placed in the respective portion.

DETAILED DESCRIPTION

Throughout the present application, to be consistent with available bin-cover literature and to underline the general applicability of the proposed algorithm, the following terminology is adopted:

The pieces being assigned to containers are referred to as items, and the containers as bins. The most important property of an item is its size, which determines how much of a bin's storage capacity it occupies. Size can encompass one or more characteristics including the weight, length, volume or density of an item. In the description below, the primary size characteristic used is weight.

The storage capacity of a bin is called its demand and the level of a bin is the sum of the sizes of all items in the bin. If the level of a bin equals or exceeds its demand, we say that the bin is closed. Otherwise it is open. A waste is defined for a closed bin, and is the difference between its level and its demand. For example, in fish fillet packing applications, a bin corresponds to a container, an item to a fish fillet, and the size of an item to a fillet's weight.

In a comparison to the more traditional bin-cover problem, where only the size of a single upcoming item, which is due for allocation to a receiver, is known, knowing the size of the m upcoming items in the input sequence according to the present approaches has some important implications for designing an effective algorithmic solution. Using an existing algorithm for the traditional bin-cover problem would lead to unnecessarily suboptimal solutions because important pieces of information are ignored. Such algorithms, knowing only the size of the single item currently being assigned, must base their assignment decisions solely on the expected size of future arriving items. For example, if small-sized items were rare, prior art algorithms would avoid leaving the level of a bin in a position close to its demand. However, if one could have knowledge that such a small item is to arrive soon, leaving the level of a bin in such a position would be a perfectly reasonable thing to do and may lead to a better solution than otherwise possible. This sort of knowledge and control is made available according to the present approaches, and hence enhanced assignments are made possible as a result.

For example, consider a case where the next three items (e.g. fish fillets) arriving are of size 400, 600, and 100, respectively, and there are two partially filled bins with level 4400 and 4500, respectively. Furthermore, assume that the target is to fill the bins to demand 5000 and that the average item size is around 400. A method that looks only at one arriving items at a time, and dispatches them to bins based on solely statistical basis, is bound to put the first item in the former bin. This is on the basis that a bin with level 4800 has better prospects than one with 4900 of accommodating a subsequent item, based on the known or assumed weight distribution of the current group of items to be allocated. However, this prior art approach results in a poor solution. In contrast, by employing the present approaches and looking at all of the actual three items when doing the dispatching, the optimal solution of placing items one and three in the second bin and item two in the first one is found, resulting in no overweight in this case. Thus, an effective algorithm, when assigning item $x_i$ to a bin, should also consider the size of items $x_{i+1}, \ldots, x_{i+m-1}$.

Searching

As the skilled person will appreciate, in theory at least, a brute-force search could be performed to work out all the different possible assignments of the m items to the available bins and then assess the merit of each possibility and choose the most promising one. There are practical problems though with such a brute-force approach. First, as the number of possible assignments using such a brute-force approach grows exponentially in m, at the rate of $O(K^m)$, it is impractical to use for all but the tiniest values for K and m. For example, even using a somewhat modest setting of K=4 and m=12 results in over 16 million possible combinations. Second, one must possess a fast computational mechanism for predicting the future expected waste of partially filled bins, as such an evaluation is required for assessing each of the numerous possible assignments. Assuming that each possibility can be searched and evaluated in only one millisecond, the decision to which bin to dispatch $x_i$ to would nonetheless take over 4 hours. This is clearly impractical.

According to the present approaches, an anytime lookahead-based search algorithm is employed for this task. Preferably, the algorithm employs one or more techniques including cutoff bounds, action ordering, progressive lookahead, and an efficient future-waste predictor. The algorithm with these enhancements thus reduces the search space by several orders of magnitude, thereby meeting the imposed real-time constraints which are present in practice, while still returning high-quality low-waste assignments.

Assignment

The anytime lookahead-based search algorithm can be utilized to assign a plurality of items to a corresponding plurality of containers.

A preferred assignment method, LOOKAHEAD_ASSIGN(X, B), is outlined as Algorithms 1 and 2 below. The former is an any-time driver, which initiates the assignment process and calls upon the latter to use a progressively deeper lookahead, where the latter performs the actual lookahead search (DFS_BnB) that explores the different possible assignments of items to bins. The variables X and B are arrays containing the size of the known items $(x_i, x_{i+1}, \ldots, x_{i+m-1})$ and the level of the bins, respectively. The array A contains the assignment currently under investigation in the lookahead search, and $A_{min}$ stores the best assignment found so far. The assignment contained in array A at any given time may be partial, i.e. only some of the m items may have thus far been assigned, or it may be total, wherein the algorithm has assigned all m items to a respective bin.

---

Algorithm 1 LOOKAHEAD_ASSIGN( X[ ], B[ ] )

1: $A_{min}[\,] \leftarrow (\,)$
2: for m = 1 to length(X) do
3:     $w_{min} \leftarrow \infty$
4:     $A[\,] \leftarrow (\,)$
5:     DFS_BnB(m, ( ). A)
6:     if ( time_is_up ) then
7:        break
8:     end if
9: end for
10: return $A_{min}[1]$

---

Algorithm 2 DFS_BnB( i. $w_{actual}$, A[ ] )

Global: X[ ]. B [ ]. $A_{min}[\,]$. $w_{min}$
1: if ($w_{actual} \geq w_{min}$) then
2:     return
3: else if (i > length(X)) then
4:     $w_{total} \leftarrow w_{actual}$ + expected(B)
5:     if ($w_{total} < w_{min}$) then
6:        $A_{min} \leftarrow A$
7:        $w_{min} \leftarrow w_{total}$
8:     end if
9:     return
10: end if
11: order(B, O)
12: for o = 1 to length (O) do
13:     b = O[o]
14:     if (allowed(i. b, B, A)) then
15:        A[i] ← b
16:        $w_o \leftarrow$ assign (X[i], B[b])
17:        DFS_BnB(i + 1. $w_{actual} + w_o$, A )
18:        deassign(X[i], B[b])
19:        if ( time_is _up ) then
20:           break
21:        end if
22:     end if
23: end for

---

Algorithm 1 starts by initializing the best assignment as an empty one. That is, all items are initially unassigned. Then it can call upon Algorithm 2 to progressively perform a deeper and deeper lookahead search (lines 2-9) to assess what the optimum assignment of the current item is, taking into account the subsequent (m−1) items. The variable m tells the algorithm 1 how far to look ahead. That is, when m=1 procedure DFS_BnB looks only as far as item X[1] ($x_i$), when m=2 items X[1] ($x_i$) and X[2] ($x_{i+1}$) are looked at, etc. This continues until either all the m items have been considered or the allotted time is up (lines 6-7). This means that the algorithm can at any time return a solution.

It can be seen that, although a tentative total assignment of all the items in X is done, the algorithm in the end only commits to assigning the first item (line 10). This is because at the next time step in the assignment process the size of a new item will become known, as part of the group of items to be considered for allocation, possibly resulting in a quite different optimal assignment.

As will be further understood in relation to FIG. 3 below, the DFS_BnB procedure according to Algorithm 2 traverses the search tree in a depth-first left-to-right manner, backtracking its steps as necessary. The branches of the search tree are defined by the different possible combinations of the items to be allocated to the available bins. The function takes two arguments: the index of the item being assigned (range 1 to m) and the sum of the actual waste of bins that have been covered by the current (partial) assignment.

Two conditions cause the algorithm to backtrack and continue to look for a better alternative assignment. First, if a complete assignment has been performed (lines 3-9), such that either all m items which are being considered at the present depth have been tentatively assigned, the algorithm backtracks after evaluating the resulting state of the bins for expected waste. This "expected waste" approach is discussed further below. If a new best assignment has been found as part of this total (tentative) assignment process, it is stored in $A_{min}$ (line 6).

Secondly, the algorithm backtracks during the assignment process when the waste already accumulated on the branch in question exceeds the quality (i.e. amount of resulting waste) of the best assignment found so far (lines 1-2). This backtracking point is known as a "cutoff bound" and is important for pruning off non-viable partial assignments early. This so-called branch-and-bound based cutoff strategy is more effective the earlier a reasonably good low-waste solution is found. Thus, to maximize its effectiveness the method preferably reorders the possible assignment actions such that good ones are more likely to be explored earlier than inferior ones.

The order function (line 11) decides the order in which to consider the open bins as well as throwing out bins which are probably irrelevant for item $x_i$. In particular, it aims to order the bins such that, if available, the bin $A_{min}$[i] is always tired first on a subsequent iteration. In lines 12-23 the different ways to assign item $x_i$ to the open bins are tested successively. The function assign puts item $x_i$ in bin $b_j$. If a bin is covered, i.e. it has reached its target fill level and so is full, the function outputs the waste for that bin and empties it. If a bin is not covered, the function returns a zero "0". The function deassign undoes any changes made by assign. The function allows checks for user-defined constraints to see whether item $x_i$ is allowed to go into bin $b_j$; if not, that action is not considered.

Expected Waste Calculation

In the aforementioned search and assignment procedure, at each leaf node where all the m items have been assigned to bins, i.e. at the end of a branch for a specified item depth, the overall quality of the particular assignment is assessed (line 4 in Algorithm 2). The assessment is based on two elements: first, the actual (i.e. resulting) waste of bins that were filled to their target levels during the assignment of the m items (if any), accumulated in the $w_{actual}$ variable, and, second, the expected future waste of the empty and partially filled bins remaining in the set-up (calculated by the expected (B) function). Because of the frequency of this calculation, i.e. at every leaf node, it is important that it is done in a computationally efficient way. There exist methods for doing so based on Markov chains but here we use a different approach: each bin is evaluated individually but in a way such that the total unused capacity of the other bins is also taken into account.

Algorithm 3 below provides the details of the expected future waste calculations, where the function f is the one provided in FIGS. 4 and 5.

---

Algorithm 3 expected( B[ ] )

Global: mean
1: $u_{total}$ ← ( )
2: for b = 1 to length (B) do
3:   $u_{box}$[b] ← capacity_of_bin(b) − B[b]
4:   $u_{total}$ ← $u_{total}$ + $u_{box}$[b]
5: end for
6: $w_{exp}$ ← ( )
7: for b = 1 to length(B) do
8:   $u_{remaining}$ ← $u_{total}$ − $u_{box}$[b]
9:   $w_{exp}$ ← $w_{exp}$ + f ($u_{box}$[b], ⌊$u_{remaining}$/mean⌋)
10: end for
11: return $w_{exp}$

---

Algorithm 3 calculates and returns the expected waste of the partially filled bins. It starts by calculating the total unused bin capacity accumulated over all available bins (lines 1-5). Then for each of the bins (lines 7-10), their expected future waste is computed as a function of both their own unused capacity and the unused capacity of the remaining bins as shown in the call to function "f" in line 9. The first argument to the f function is the unused capacity of the bin itself, and the second argument is the unused capacity of remaining bins normalized as the number of items expected to fit into the bins' remaining capacity. This normalization is done by dividing the unused capacity by the average item size of the m items allocated. This second argument determines which expected future waste curve to use (see e.g. FIG. 5). Finally, the total expected future waste accumulated over all bins is returned (line 11).

As mentioned above, the expected waste of an individual bin is a function of its unused capacity as well as the size distribution of the items being packed. FIG. 4 shows an example of such a relationship assuming, as we do, that the size of the items being packed are normal distributed—in this particular example the item size distribution is N(500,55). The x axis shows current unused capacity of a bin in grams, and the y axis shows the expected waste in grams.

Figure 4:
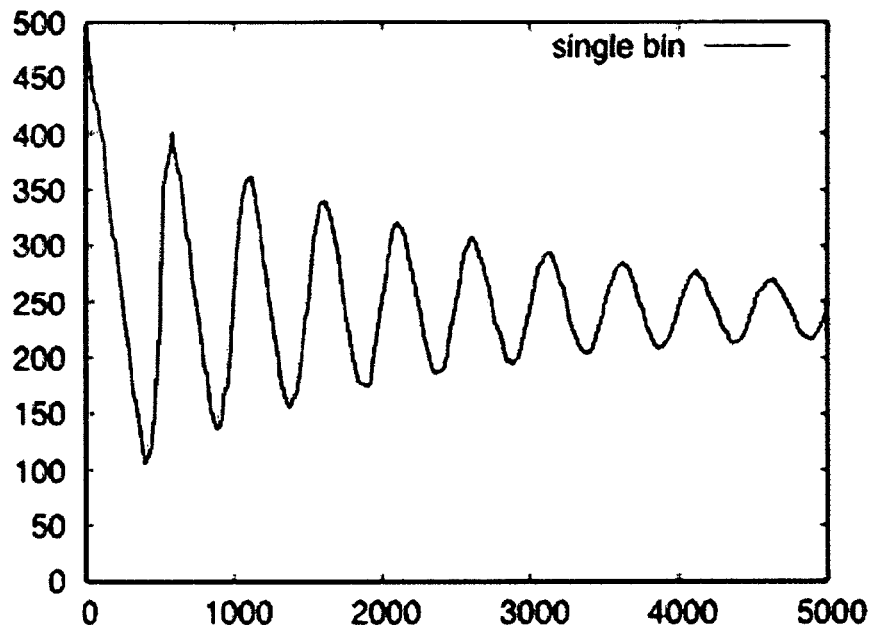
FIG. 4 shows the expected waste of a single bin as a function of its capacity.
Figure 5:
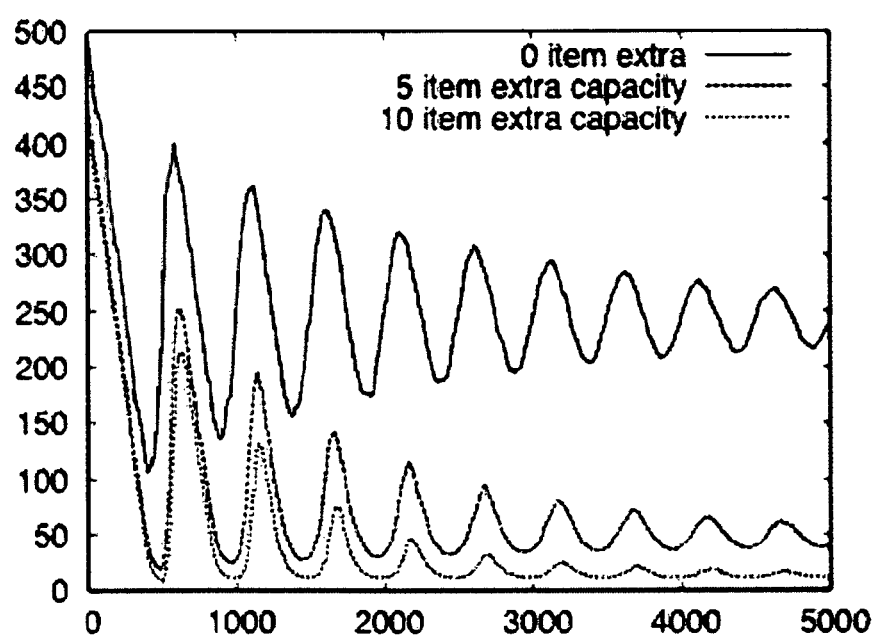
FIG. 5 shows the expected combined waste of a plurality of bins as a function of their capacities.

The graph in FIG. 4 tells us the expected waste of the bin once it fills as a function of its current unused capacity given that arriving items are drawn from the aforementioned distribution; for example, if the current unused capacity of the bin is 1 kg., we may expect a final waste of ca. 150 g. This example assumes that the given bin is the only one available. However, if there are other bins also available that are only partially filled we have more degrees of freedom in choosing which bin to dispatch the item into, generally resulting in less overall waste. Thus, the unused capacity of the remaining bins must be taken into account as well when assessing each individual bin. For simplification and abstraction purposes, we keep track of only the total unused capacity of the remaining bins. FIG. 5 shows different expected waste functions based on several different total unused capacity—the higher the capacity the lower is the expected waste.

Thus, not only can the present approaches determine the actual waste that would result for receivers which are filled during a particular allocation of m items, it can go one step further and also calculate the expected waste that will result once the remaining available bins have been filled to their target levels. This calculation is a very important is assessing the relative merit of different allocation options for placing a group of m items into a plurality of receivers, since the overall aim of the allocation is to fill the bins efficiently, with as little waste as possible.

The expected waste calculation according to the present approaches is advantageous as compared to prior art methods since it makes use of both the actual remaining capacities in the available bins or other receivers to be filled and the actual size information for individual items in the group of items to be allocated, when outputting expected waste values. It therefore doesn't solely rely on trends observed for previously available items or receivers when predicting future waste, but also bases the prediction on the actual items and receivers that will combine and result in that waste being created. The expected waste calculation can be output for every item in a group of m items and for every possible allocation option for that item. Therefore a highly intelligent and accurate waste prediction approach is achieved, but still in a computationally efficient manner, which is straight forward to implement in practice.

EXAMPLE

Figure 3:
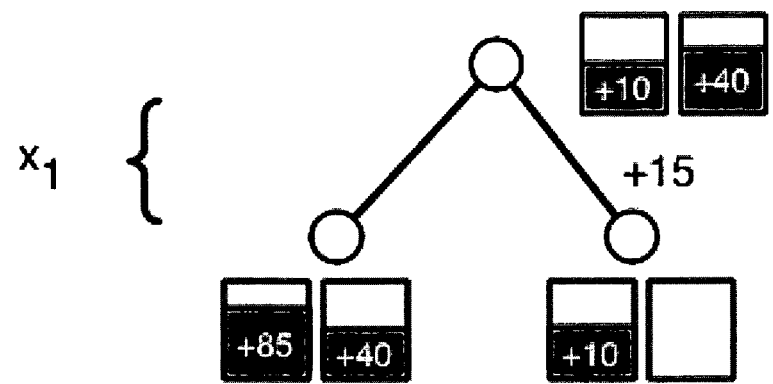
FIG. 3 depicts a look ahead search at 1-item and 2-item depths.
Figure 3:
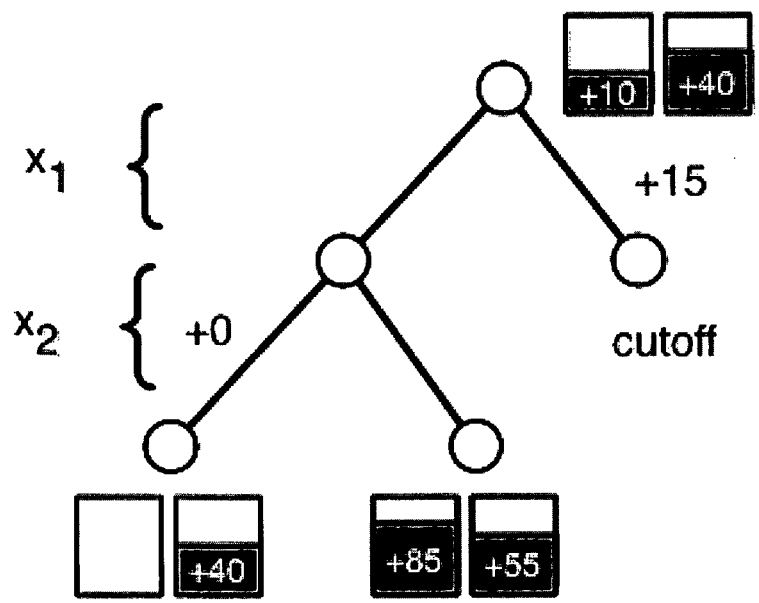

An illustrative example is depicted in FIG. 3. There are two bins each with demand 100, initially in the state [10,40], and two known items X={75,15}. As the skilled reader will appreciate, any reasonable assumptions can be incorporated into the calculations in order to improve the efficiency of the assignment whilst maintaining accuracy. In this particular example, we assume that the expected waste calculation function evaluates the expected end waste of each open bin that is currently empty to be +5, the expected end waste of each open bin that is currently non-empty but less than half-full to be +10, and the expected end waste of all other open bins to be +15.

First a 1-item deep lookahead is performed, as seen in the top-level tree in the figure. There are two possible assignments: the first item can go into either bin. The algorithm tries first to put the item into bin one, resulting in bin-state [85,40]. Here there is no actual waste, but given our aforementioned assumptions the expected waste of the resulting bin-state is +25, so for this assignment the total waste $w_{total}$=0+25=+25.

The second possibility of putting the first item into bin two, results in state [10,0] (the bin closed with waste +15 and was replaced with an empty bin) giving $W_{total}$=15+5=+30, and is thus not preferred. That is, the 1-item deep lookahead search suggests placing the first item, with size 75, into bin one.

In the next iteration, a 2-item deep lookahead search is performed, shown as the bottom-level tree. Assuming we are not using action reordering, the method would now again first try to place item one into bin one (the left branch), then item two also into bin one, resulting in bin-state [0,40], giving $W_{total}$=0+15=+15 (bin one closed with no waste). As this is the best assignment found on this iteration so far, it is stored. The algorithm has performed a complete assignment of both items at this 2-item deep level, so now backtracks and tries instead assigning item two to bin two, resulting in bin-state [85,55] giving $W_{total}$=0+30=+30.This assignment is inferior to the best assignment already found in this iteration, so the algorithm ignores it and, as this is the last action, further backtracks up one level and now reassigns item one to bin two (the right branch). This, however, closes bin two with an actual waste of +15, and as this partial assignment is already no better than the best assignment found so far (+15), this branch can be cutoff. Again, as action two is the last one at this level, and no further backtracking is possible the iteration finishes. The best assignment based on the 2-item deep lookahead search is thus to place both the items into bin on.

Thus, as illustrated by the example above, an efficient and effective method of assessing the possible assignment of an item, taking into account the characteristics of subsequent items, whilst at the same time avoiding consideration of every single combination of the available items and bins, is provided. Although a simple two item example has been given, the skilled person will appreciate that the principle applies equally to a larger number of items and to any possible number of bins. Of course, in practice a limited number of bins will be open for filling at any one time. Furthermore, the depth of the search tree and the number m of items considered will depend on many considerations including the rate at which the computer or program running the method can process the steps and output assignment information.

Variations and Applications

Any suitable computer implemented or other control means can be used for implementing the present approaches. Furthermore, any suitable conveyance and distribution apparatus may be used.

An apparatus which is particularly well suited for the methods being described herein is described in Icelandic patent no. 2320. That apparatus is, for example, well suited for packing of interleaved packs discussed here above. The present methods are however not limited to work with this apparatus. Other apparatus types, for example regular grading equipment as described in U.S. Pat. No. 5,998,740, could be used. Other alternatives are, for example, slotted conveyors. In fact, any type of equipment which facilitates sequential selection of items into portions based on one or more characteristics could be used for this purpose.

Any suitable means for weighing the items to be allocated and registering those weights may be implemented according to the present approaches. The skilled reader will be familiar with such suitable dynamic weighing means and, for example, microprocessors for registration of the weight and location of items to be allocated.

Instead of or in addition to filling a receiver bin up to a target weight level, the present approaches can be used to fill one or more bins with a predetermined number or number range of items therein. Also, instead of a single target level, a bin may have multiple preferred target levels lying within a specified range, wherein some of the target levels may be preferable to others. Furthermore, filling of one or more receiver bins can be done at random, without employing the branch and bound strategy described above, until the fill level of that bin reaches a certain threshold below its target fill level.

The present approaches have been described above with respect to sequential item access, for example, using a conveyor. However random item access would also work, despite random access not being a requirement for successful implementation of the approaches.

In addition to allocating an item to one of a plurality of receiver bins, the present approaches can present the option of rejection an item. For example, if the available possible allocations of the present item, based on the current m items being considered, cannot result in a waste level that is below a predetermined threshold, the present item could instead be rejected or set aside for future allocations when the resulting waste could be below that threshold level.

Any suitable length or number of conveyance means can be employed according to the present approaches. Furthermore, any number of bins or other receiving areas may be used. The present approaches can set a limit on the number of bins which are available for filling at any given time, and may, as a result, prioritize the filling of one or more particular bins at any given time in order to keep the rate of dispatching full bins to a required level whilst at the same time working within the bounds of how many bins can be open at any given time.

Whilst the approaches discussed above relate primarily to food portioning, it will be appreciated that the present approaches apply equally well to apportionment of any item type. According to the item type and user preferences, suitable restrictions on the assignment process can be exerted.

The invention claimed is:

1. A method of allocating a next first item from a group of items forming an input sequence to a receiver, selected from a group of receivers, comprising:
    obtaining characteristic property information for next first and second items in said group of items;
    obtaining capacity information for said group of receivers;
    using the characteristic property of the first item and a characteristic property of a selected second item within said group of items to consider possible options for allocating said first and second items to said group of receivers;
    considering which receiver or receivers could be selected for successive allocation of the first and second items in said group of items thereto before determining which receiver should be selected for allocation of the first item thereto, wherein considering successive allocation of the first and second items to said group of receivers includes considering successive allocation of the first and second items to two or more different combinations of receivers and comparing the respective effects on the capacity information for said group of receivers;
    taking into account the respective capacities of receivers in said group of receivers, determining which receiver should be selected for allocation of the first item thereto; and
    directing a first item to the selected receiver, as a result of said determination.

2. A method as claimed in claim 1 wherein taking into account the respective capacities of receivers in said group of receivers includes considering at least one of: the actual capacity of a receiver after allocation of an item thereto and a predicted capacity of a receiver after allocation of an item thereto.

3. A method as claimed in claim 2 wherein a predicted capacity of a receiver is obtained using historical allocation information and current allocation information, wherein said current allocation information includes at least one of:
    characteristic property information for the remaining items to be allocated within said group of items; and
    capacity information for the receivers within said group of receivers that are available for allocation of an item thereto.

4. A method as claimed in claim 1 wherein the capacity information for said group of receivers includes the current fill level and a target fill level for one or more receivers within said group of receivers.

5. A method as claimed in claim 4 wherein the step of considering possible options for allocating said first and second items to said group of receivers includes considering allocation of the first item to each of a plurality of receivers and comparing the resulting fill level to a respective target fill level for each of said plurality of receivers.

6. A method as claimed in claim 4 wherein the step of considering possible options for allocating said first and second items to said group of receivers includes considering allocation of the second item to each of a plurality of receivers and comparing the resulting fill level to a respective target fill level for each of said plurality of receivers.

7. A method as claimed in claim 1 further including the step of considering which receiver or receivers should be selected for allocation of each of the items in said group of items thereto before determining which receiver should be selected for allocation of the first item thereto.

8. A method as claimed in claim 1 further comprising the step of, during a predefined determination time period, considering which receiver or receivers should be selected for allocation thereto of as many items as possible within said group of items, until expiration of said
    determination time period, before determining which receiver should be selected for allocation of the first item thereto.

9. A method as claimed in claim 1 further comprising the step of discontinuing consideration of allocation of an item to a particular receiver or combination of receivers if the resulting receiver capacity information for that combination is less favorable than capacity information resulting from addition of said item to a previously considered receiver or combination of receivers.

10. method as claimed in a claim 1 further comprising prioritizing a receiver or combination of receivers for consideration of the option of allocating an item thereto, according to the capacity information for said group of receivers.

11. A method as claimed in claim 1 further comprising the step of ignoring a receiver or combination of receivers for consideration of the option of allocating an item thereto, according to capacity information for said receiver or combination of receivers.

12. A method as claimed in claim 1 comprising additionally using a user defined constraint to determine which receiver should be selected for allocation of an item thereto.

13. A method as claimed in claim 12 wherein said user defined constraint concerns any of: the orientation of an item, the configuration of two or more allocated items within a receiver, the number of items to be allocated to a receiver, a time limit for allocating items to a receiver, the number of items in said group of items, and the number of receivers in said group of receivers.

14. A method as claimed in claim 1 further comprising the step of directing the first item to the selected receiver, as a result of said determination.

15. A method as claimed in claim 1 further comprising the step of predicting future capacity information for said group of receivers using the allocation determined for said first item and a characteristic property of at least one of the remaining items in said group of items.

16. A method as claimed in claim 1 comprising, after determining which receiver the first item should be allocated to, obtaining updated characteristic property information for said group of items and updated capacity information for said group of receivers, updating the identification of first and second items within the group of items and repeating the method of claim 1 for allocation of the newly-identified first item.

17. An allocation apparatus including item conveyance means and at least one receiver, wherein said apparatus is arranged for operation according to the method of claim 1.

18. A computer readable medium including instructions for carrying out the method according to claim 1.

\* \* \* \* \*